United States Patent [19]

Flender

[11] 4,049,888
[45] Sept. 20, 1977

[54] CENTRALLY-ACTIVATED DEFERRED-ACTION SILVER-ZINC BATTERY

[75] Inventor: Jacques Flender, Le Raincy, France

[73] Assignee: SAFT-Societe des Accumulateurs Fixes et de Traction, Romainville, France

[21] Appl. No.: 763,098

[22] Filed: Jan. 27, 1977

[30] Foreign Application Priority Data

Oct. 13, 1976  France ............................... 76.30745

[51] Int. Cl.² ........................................... H01M 6/38
[52] U.S. Cl. .................................... 429/115; 429/116; 429/152
[58] Field of Search ............... 429/115, 116, 113, 114, 429/118, 110, 149, 152, 153, 154

[56] References Cited

U.S. PATENT DOCUMENTS

| | | | |
|---|---|---|---|
| 2,852,592 | 9/1958 | Salauze | 429/116 |
| 3,445,295 | 5/1969 | Smith et al. | 429/115 |
| 3,464,863 | 9/1969 | Barron | 429/116 X |
| 3,674,566 | 7/1972 | Powers | 429/116 |

FOREIGN PATENT DOCUMENTS 1,558,423   1/1969   France ................................. 429/116

*Primary Examiner*—Anthony Skapars
*Attorney, Agent, or Firm*—Kenyon & Kenyon, Reilly, Carr & Chapin

[57] ABSTRACT

A centrally-activated deferred-action silver-zinc battery has a central well defined by a stack of electrodes and separators each having a central hole. Isolating washers are placed around the central holes of each metal sheet and include recesses which provide curved channels for conveying electrolyte from the well towards the electrodes. The restricted cross-section and extended length of these channels ensure a greater electrical resistance to leakage currents which flow between couples via the electrolyte during activation. Pyrotechnic means are provided to activate the battery by rupturing a fragile partition and rapidly forcing electrolyte from an isolated compartment via the rupture in the partition into the well and from thence via the curved channels to spaces provided between electrodes of opposite polarity.

11 Claims, 6 Drawing Figures

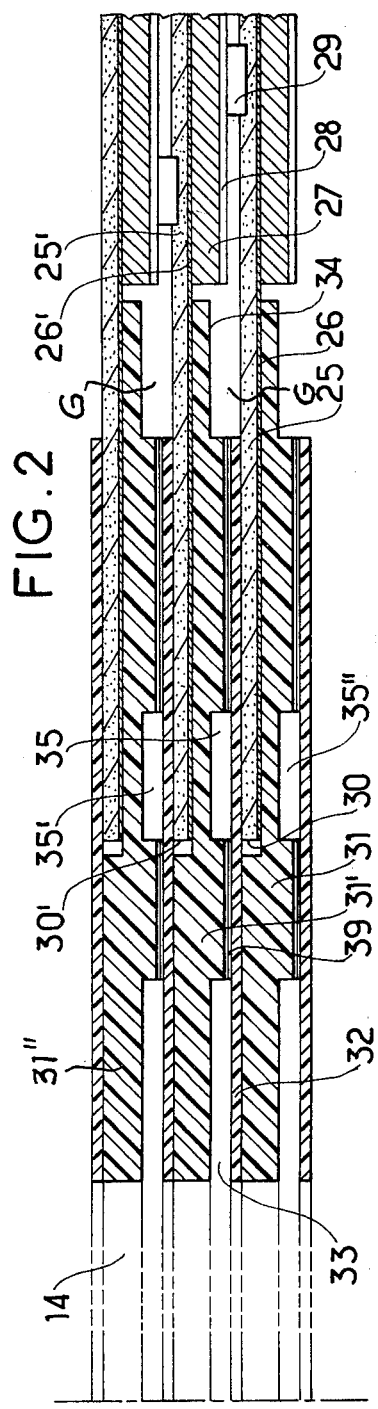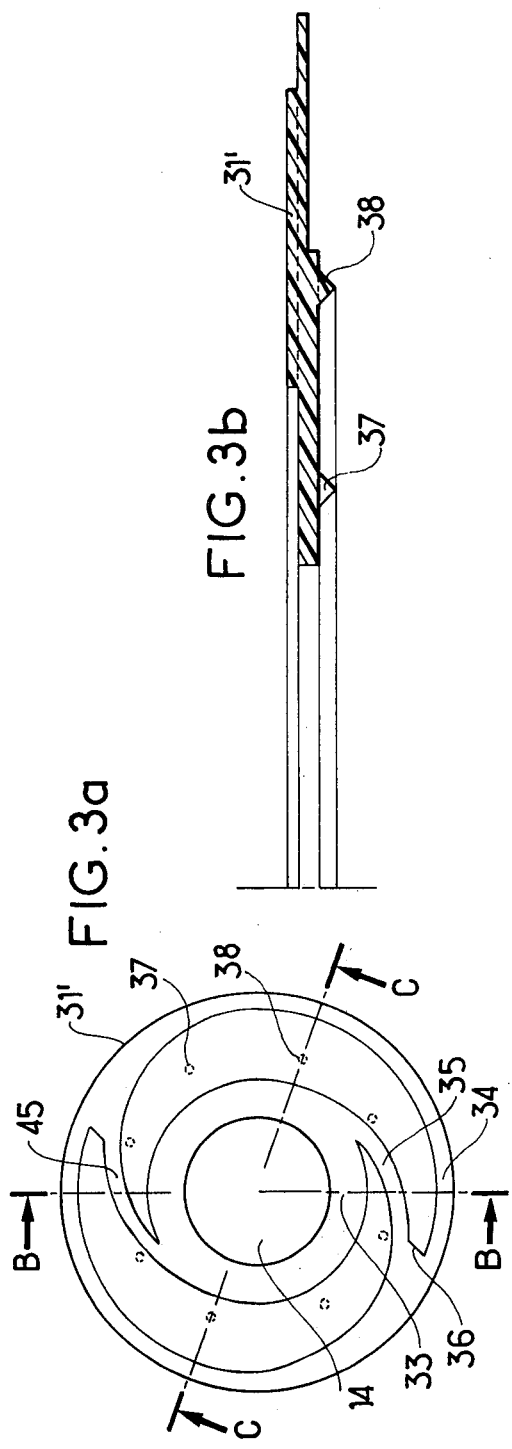

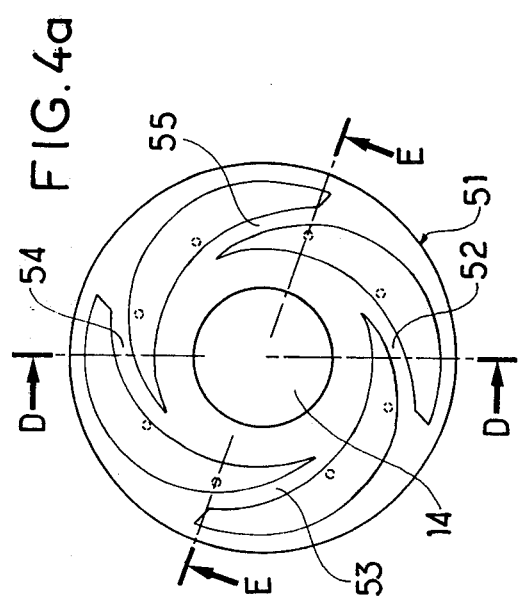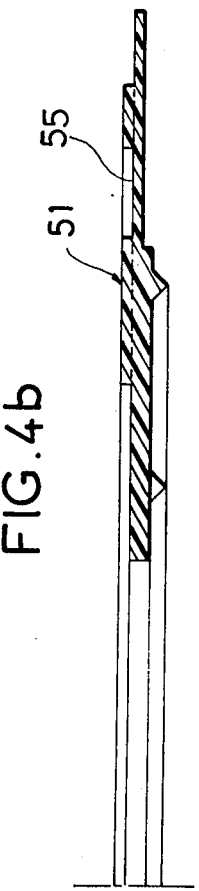

CENTRALLY-ACTIVATED DEFERRED-ACTION SILVER-ZINC BATTERY

BRIEF SUMMARY AND BACKGROUND OF INVENTION

The present invention relates to a centrally-activated deferred action battery constituted by a stack of primary couples and in particular it relates to an arrangement for improving the electrical isolation of the couples from each other and from the central portion to prevent or minimize leakage current as the electrolyte flows to the couples during activation.

Deferred action batteries are described in French Pat. No. 1,558,423 for example. In that patent each couple comprises a negative electrode constituted by a layer of zinc, a positive electrode of silver oxide, a paper separator provided with small insulating spacer elements which delimit a gap for receiving the electrolyte, and a copper sheet separating each couple from the adjacent couple. The positive electrode of one couple and the negative electrode of the adjacent couple may both be mounted respectively on opposite sides on this copper sheet to constitute a duplex electrode. The electrodes and the copper sheet are each in the form of a disc having a hole at its center so that the stack delimits a central well through which the electrolyte is supplied to the electrodes during activation. An insulating washer is provided around the central hole of each copper disc on which a layer of zinc is mounted. These washers are intended to prevent or minimize electrical leakage currents between the couples due to the presence of a film of electrolyte on the edge of the copper disc.

However, it has been observed that during activation these washers are not able to prevent the electrical leakage currents which pass through the electrolyte while it is flowing into the couples.

Preferred embodiments of the present invention have for an object the prevention or reduction of these leakage currents without excessively hindering the flow of the electrolyte during battery activation.

The present invention provides a centrally activated battery comprising a stack of couples each constituted by a positive plate and a negative plate each having a central hole and separated from each other by a gap for receiving the electrolyte, each couple being mechanically separated from the adjacent couple and being electrically connected thereto by a metal sheet also having a central hole, each of the said sheets having a first insulating washer at its center, the hole in the center of the washer being of smaller diameter than the hole in the center of the sheet, and cooperating with a second insulating washer to insulate the inner edge of the said sheet, wherein one face of the first washer rests on the second washer of the adjacent sheet and includes at least one recess such that the recess together with the said second washer of the adjacent sheet forms a channel for conveying electrolyte from the central space or well to the said gap and wherein the recess is so shaped that the channel follows a path which is oblique to the local radial direction of the central hole.

The channel is preferably curved.

In this way the electrolyte flows into the electrolyte-receiving gap of each couple via channels which are of restricted cross-section and whose oblique and curved paths are longer than a directly radial path, thereby considerably increasing the electrical resistance to leakage currents during activation of the battery.

Preferably the curvature of the channels is towards the center of the hole in order to facilitate the flow of electrolyte towards the couples. Advantageously the channels widen out towards the outer edge of the washers to better distribute the electrolyte.

Embodiments of the invention are described by way of example with reference to the accompanying drawings in which:

FIG. 2 is a cross-section on a larger scale of a region marked A in FIG. 1;

FIG. 3a is a view of the underside of a two-channel washer for isolating the couples shown in FIG. 2;

FIG. 3b is a half-section on an enlarged scale along a line C—C of FIG. 3a;

FIG. 4a is a view of the underside of a four-channel washer constituting a variant of the washer for isolating the couples shown in FIG. 2; and FIG. 4b is a half-section on the enlarged scale along a line E—E of FIG. 4a.

DETAILED DESCRIPTION

Figure 1:
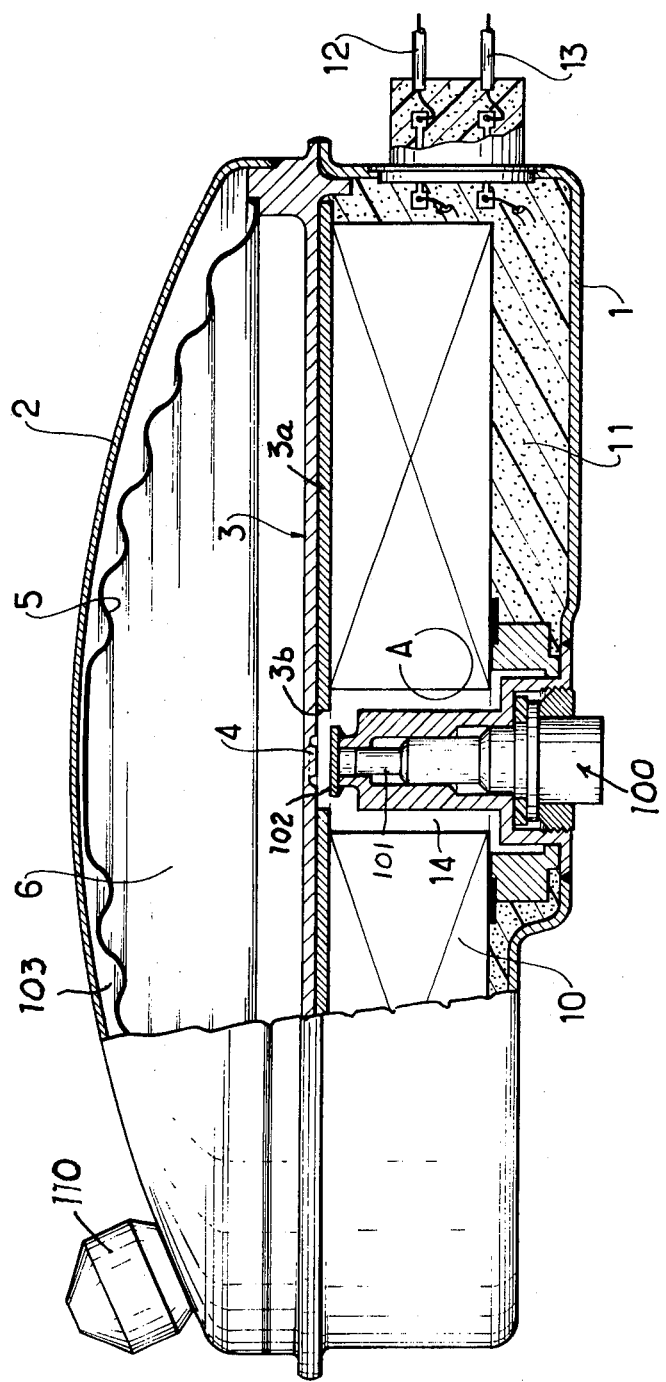
FIG. 1 is a partially cut-away side view of a battery according to the invention.

In FIG. 1 a cylindrical container 1 closed by a cover 2 is separated into two compartments by a metal partition 3, disposed parallel to the base of the container 1 and welded both to the container 1 and to the cover 2.

The upper compartment between the cover 2 and the partition 3 contains a deformable metal membrane 5 welded along its periphery to the partition 3 and forming with it a reservoir for the electrolyte 6 before activation of the battery. The lower compartment defined between the partition 3 and the container 1 contains a stack of active constituants schematically represented by a block 10 and electrically insulated from the container 1 by an insulator 11. The electrodes and separators, constitute a plurality of elementary couples connected in series to form a battery whose output terminals are referenced 12 and 13. The active constituents all have a central hole which in assembly define and form a central well 14 through which the electrolyte flows during activation after perforation of a central frangible portion 4 of the partition 3. The partition 3 is supported by a plate 3a having a central hole 3b underlying the frangible portion 4. The plate 3a may be metallic or insulating material.

FIG. 2 is a section on a larger scale of the portion marked A of block 10 in FIG. 1, showing a part of three elementary couples, one of which is described below. The negative electrode is constituted by a layer of zinc 25 which is deposited on a disc-shaped copper sheet 26; its positive electrode 27 is constituted by silver oxide and is deposited on a copper sheet 26' analogous to the copper sheet 26 and on whose other side there is deposited the negative zinc electrode 25' of the adjacent couple. The electrodes 25 and 27 are separated by a paper separator 28 which includes insulative spacers 29 thus providing a gap G between adjacent positive and negative electrodes of each couple.

The inner edges 30 of disc-shaped copper sheet 26 and its negative electrode 25 are protected by a first, shaped, washer 31 and a superposed second, plain, washer 32 both having a central hole which is of smaller diameter than the central hole of the copper disc 26. The inner edge 30 is received in a recess in the first washer 31. Both the washers 31 and 32 are made of an insulative material, e.g., Rilsan, and are integrated or joined together as by ultrasonic welding for example. The welding may be limited to a few welding spots 37, 38 projecting from one face of one of the washers at regular intervals around their central holes and peferably near to the inner edge 30 of the negative electrode to avoid any displacement of the washers with respect to the copper disc 26. These welding spots are described in detail below.

The shaped washer 31 (or the analogous washer 31' which protects the inner edge 30' of the copper disc 26' and the zinc layer 25' of the adjacent couple) embodies a novel feature of this invention as shown in FIGS. 3a and 3b. In FIG. 2 the washer 31' is shown in half section on a line B—B of FIG. 3a and at a larger scale. The inner portion and the outer portion of the shaped washer 31' are recessed respectively at 33 and 34, while an intermediate recess 35 forms, together with the plain washer 32 of the adjacent couple, a narrow curved channel; this channel enables the electrolyte to pass from central well 14 into the space or gap G between the negative electrode 25 and the positive electrode 27. As shown in FIG. 3a, the recess 35 (and consequently the channel it delimits) extends obliquely with respect to the diameter B—B, i.e., it follows a generally spiral path around the well 14. The recess 35 widens out at its outer end 36 to even out the distribution of the electrolyte between the electrodes. Incidentally, the entry of electrolyte into the channel thus formed is facilitated by its general curvature towards the center of the washer 31'.

A sheet 39 of insulative material which is adhesive on both its faces joins the washer 32 to the face of the washer 31' which has the recess 35 (see FIG. 2); thereby sealing the edges of the channel defined by this recess and washer 32.

The cross-section C—C of the washer 31' of FIG. 3b (upsidedown with respect to FIG. 2) shows two of the above mentioned welding spots referenced 37 and 38. They are small conical projections situated near to the inner edge 30' of the copper disc 26' and the negative electrode 25'.

As can be seen in FIG. 2 the recesses 35,35' and 35'' formed respectively in three superposed washers, 31,31' and 31'', are aligned about a single axis parallel to that of the stack 10 of couples.

The example of the washer 31' which has just been described includes two similar recesses 35 and 45 symmetrically disposed about the center of the washer and has the following dimensions:
 outside diameter of the washer : 45mm
 diameter of the central hole : 14mm
 length of the recesses 35 and 45 : 15mm
 width of the recesses : 3mm
 depth of the recesses : 0.3mm It has been observed that the presence of such washers enables the battery to be activated in five seconds while considerably reducing the electrical leakage currents which pass through the electrolyte as it flows into the couples upon activation of the battery.

In order to shorten the activation time, washers can be used which have a larger number of channels such as the washer illustrated in FIGS. 4a and 4b. FIG. 2 could equally well be a half-section on an enlarged scale of the diameter D—D of the washer in FIG. 4a.

In these figures a washer 51 has four similar narrow recesses 52, 53, 54 and 55, all spirally oriented towards the central hole and regularly spaced at 90° intervals around the washer 51. Thus for recesses of substantially the same dimensions as those of the washer shown in FIGS. 3a and 3b the activation time is reduced to three seconds, but naturally the leakage currents are slightly greater.

The number and length of channels defined by recesses 52, 53, 54, 55 with a plain washer like washer 32 are thus chosen as a function of maximum acceptable values for the activation time and for the leakage current.

The battery may be activated in suitable manner. In the embodiment shown a pyrotechnically operated punch 100 extending into well 14 from the casing bottom 1 includes a piston 101 which punctures a frangible disc 102 and then the frangible portion 4 of partition 3 when the pyrotechnic punch 100 is fired, thus providing an outlet for electrolyte 6 in the upper compartment defined by deformable membrane 5 and partition 3. An additional pyrotechnic device 110 is mounted in the cover 2. This device 110 when fired discharges a gas under pressure into the space 103 between the deformable membrane 5 and cover 2 causing deformation of membrane 5 and forcible rapid expulsion of electrolyte 6 from the upper compartment via the ruptured partition 4 into the well 14 and via the channels to the spaces or gaps G between electrodes of opposite polarity thus activating the battery. In the activation operation the pyrotechnically operated punch 100 is fired first and thereafter the pyrotechnic device 110 is fired. Other suitable means for rupturing the partition 4 and expulsion of electrolyte 6 from the upper compartment 6 into well 14 and delivery therefrom via channels to gaps G may be utilized.

Naturally the invention is not limited to the illustrated embodiments described above without going beyond the scope of the invention as claimed, and any means described can be replaced by equivalent means. In particular the two washers like washers 31' and 32 or 31 and a washer like washer 32 defining electrolyte passing channels can be made as a single part. There is no intention therefore of limitation to the exact disclosure hereinabove presented.

What is claimed is:

1. A centrally activated deferred-action battery comprising a stack of couples each constituted by a positive plate and a negative plate and separators each having a central hole forming a central well, means spacing said plates from each other to provide a gap between adjacent facing positive and negative plates for receiving electrolyte, means mechanically separating each couple from the adjacent couple, a metal sheet electrically connecting adjacent couples, said sheet also having a central hole, a first insulating washer with a hole in the center of the washer which is of smaller diameter than the hole in the center of the metal sheet, a second insulating washer cooperating with said first named washer to insulate the inner edge of the said metal sheet, one face of the first washer resting on a said second washer on the adjacent metal sheet and including at least one recess such that the recess together with the said last-named second washer of the adjacent metal sheet forms a channel for conveying electrolyte from the central well to the said gap upon activation of the battery and wherein the recess is so shaped that the channel follows a path which is oblique to the local radial direction of the central hole of said first named washer.

2. A battery according to claim 1, wherein the said channel is curved.

3. A battery according to claim 2, wherein the curvature of the channel is directed towards the center of the hole of said first named washer.

4. A battery according to claim 1, wherein the channel widens out towards the outer edge of the washers.

5. A battery according to claim 1, wherein the recesses of the first-named washers in the stack have the same angular position so that they are all arranged in the stack along an axis parallel to the axis of the stack.

6. A battery according to claim 1, including means for fastening the first and second washers of a single metal sheet together.

7. A battery according to claim 1, wherein the first and second washers are integrated.

8. A battery according to claim 1, including a sheet of material with adhesive surfaces on both its faces disposed between the recess-bearing surface of each first-named washer and the second-named washer with which it cooperates to fasten the cooperating washers together.

9. A battery according to claim 1, including a container, a cover therefor, a partition dividing the container and cover into two compartments, a deformable member in one of said compartments, electrolyte confined in said one of said compartments between said deformable member and said partition, and wherein said stack is located in the second of said compartments, said partition having a frangible portion that may be disrupted to permit said electrolyte from said one of said compartments to flow into said central well and via each said channel into each said gap between facing positive and negative plates.

10. A battery according to claim 9 including means for disrupting the frangible portion of said partition to activate said battery by flow of electrolyte from said one of said compartments into said well and from said well via each said channel into each such gap.

11. A battery according to claim 10 wherein said means comprises a pyrotechnically operable punch for rupturing said frangible portion and a pyrotechnically operable member for discharging a gas under compression to effect forcible discharge of electrolyte into said well.

* * * * *